United States Patent [19]

Anderson et al.

[11] Patent Number: 4,771,926
[45] Date of Patent: Sep. 20, 1988

[54] ARTICLE CARRIER FOR VEHICLES

[76] Inventors: Talbert E. Anderson, 10003 Pinehurst, Baytown, Tex. 77521; Roger D. Domingue, 1403 Gober, Houston, Tex. 77017

[21] Appl. No.: 884,638

[22] Filed: Jul. 11, 1986

[51] Int. Cl.4 ............................................. B62D 43/00
[52] U.S. Cl. ................................. 224/42.13; 224/42.08
[58] Field of Search ............... 224/42.01, 42.12, 42.13, 224/42.06, 42.07, 42.08, 42.28, 42.2, 42.21; 414/462–466

[56] References Cited

U.S. PATENT DOCUMENTS

| Re. 16,665 | 6/1927 | Arndt | 224/42.13 |
|---|---|---|---|
| 1,186,073 | 6/1916 | Brown et al. | 224/42.13 |
| 1,502,495 | 7/1924 | Weinberg | 224/42.06 |
| 1,542,107 | 6/1925 | Sutherland | 224/42.01 |
| 1,546,218 | 7/1925 | Engelsen | 224/42.13 X |
| 1,571,850 | 2/1926 | Ludwig . | |
| 1,593,920 | 7/1926 | Sutherland . | |
| 1,628,072 | 5/1927 | Smith | 224/42.01 X |
| 1,809,119 | 6/1931 | Haffke . | |
| 1,884,736 | 10/1932 | King | 224/42.01 |
| 1,941,564 | 1/1934 | Lyon | 224/42.01 |
| 1,953,858 | 4/1934 | Kessler | 224/42.13 |
| 2,005,604 | 6/1935 | Thrine | 224/42.13 X |
| 2,071,644 | 2/1937 | McBrady | 224/42.01 X |
| 2,556,101 | 6/1951 | Negin et al. . | |
| 3,357,031 | 12/1967 | Edwards | 224/42.01 X |
| 3,365,084 | 1/1968 | Fernicola | 224/42.21 X |
| 3,658,201 | 4/1972 | Williams et al. . | |
| 3,845,891 | 11/1974 | Becher | 224/42.21 |
| 3,880,335 | 4/1975 | Winkler | 224/42.13 |
| 4,019,664 | 4/1977 | Weiler | 224/42.24 |
| 4,221,311 | 9/1980 | Penn . | |
| 4,241,858 | 12/1980 | Lawroski | 224/42.03 A |
| 4,282,994 | 8/1981 | Hilliard | 224/42.21 X |
| 4,327,849 | 5/1982 | Sharpton . | |
| 4,674,782 | 6/1987 | Helber | 224/42.03 A X |

FOREIGN PATENT DOCUMENTS 2402522 7/1974 Fed. Rep. of Germany ... 224/42.01
594182 9/1925 France .

OTHER PUBLICATIONS

The Universal Box by Add On sales brochure.

Primary Examiner—Henry J. Recla
Assistant Examiner—Robert M. Petrik
Attorney, Agent, or Firm—Neal J. Mosely

[57] ABSTRACT

An article carrier for attachment to recreational vehicles comprises a box-like container, for carrying articles, removably secured and supported on a spare tire mounting frame or on a separate mounting frame. The container has a bottom portion and a top portion releasably hinged thereon. The container rear wall has a tapered box-like portion extending inward and adapted to receive and substantially surround a wheel mount member of the frame. Wheel attaching lugs extend from the wheel mount member through the front wall of the box-like member into the container and the spare tire is received and secured to capture the container between the spare tire and the wheel mount member. The container top portion is removable and adapted to receive leg members for conversion to a table. A modified top portion has openings in the side walls covered with wire mesh for use in transporting animals. The mounting frame is elongated frame with one end pivotally secured to the rear end of the vehicle to pivot vertically thereabout and the other end extending to be releasably secured to the rear end of the vehicle. The horizontal positon of the container may be adjusted relative the rear end of the vehicle.

19 Claims, 4 Drawing Sheets

ARTICLE CARRIER FOR VEHICLES

BACKGROUND OF THE INVENTION

1 FIELD OF THE INVENTION

This invention relates generally to article carriers and more particularly to an article carrier to be mounted at the rear of a vehicle.

2 BRIEF DESCRIPTION OF THE PRIOR ART

Recreational vehicles, such as jeeps, are relatively limited as to interior space. These vehicles are frequently driven in remote areas and it is highly desirable to carry additional articles such as hunting or camping gear, additional water and fuel, and tools, as well as a spare tire. It is also often desirable to transport hunting dogs or other animals.

Many manufacturers of vehicles of the type mentioned have attempted to alleviate the limited space problem by mounting the spare tire exterior of the vehicle on a wheel mount bracket pivotally attached to the rear of the vehicle.

Others have attempted to solve the limited storage problem by providing attachments to the rear of the vehicle for carrying luggage and other articles. There are several patents which disclose various carriers adapted to be mounted at the rear of vehicles.

Ludwig, U.S. Pat. No. 1,571,850 discloses a collapsible storage box mounted at the rear end of an automobile having the spare tire mounted thereon.

Haffke, U.S. Pat. No. 1,809,119 discloses a rear mounted luggage carrier including a support for the spare tire; Thomas, U.S. Pat. No. 2,136,157 discloses a storage trunk rack; and Brundage et al, U.S. Pat. No. 2,776,791 discloses a hinged carrier for spare tires, each of which are carried on the rear end of an automobile and are pivoted about the horizontal axis from a vertical position to a horizontal position.

Penn, U.S. Pat. No. 4,221,311 discloses a luggage rack frame which is secured to the rear bumper of an automobile and may be pivoted about the horizontal and the vertical axis.

Williams, U.S. Pat. No. 3,658,201 discloses a series of racks for storage of various types of articles at the rear end of a jeep or pickup truck.

Sharpton, U.S. Pat. No. 4,327,849 discloses a holder for auxiliary gas cans to be attached to the hinged tire mount at the rear end of a jeep.

Southerland, U.S. Pat. No. 1,593,920 discloses a storage compartment fixedly secured to the rear end of an automobile, and Crum, U.S. Pat. No. 1,927,922 discloses a storage box removable mounted in the rear end of an automobile. Both have a support enclosure for the spare tire arranged to be pulled outwardly from the compartment similar to a slide drawer.

Negin, U.S. Pat. No. 2,556,101 discloses an auxiliary body attachment utilizing the existing tailgate for jeeps providing additional storage including a space for mounting the spare tire.

French Pat. No. 594,182 and British Pat. No. 373,948 disclose hinged supports for a spare tire on the rear end of the frame of an automobile. The spare tire is mounted so that it can be hinged or extended out position for receiving and accessing baggage or a carrier box which fits between the spare tire and the rear end of the vehicle.

The present invention differs from the prior art in providing an article carrier for attachment to recreational vehicles which comprises a box-like container for carrying articles removably secured and supported on a spare tire mounting frame or its own separate mounting frame. The container has a bottom portion and a top portion releasably hinged together and a rear wall with a tapered box-like portion adapted to receive and substantially surround a wheel mount member of the frame.

Wheel attaching lugs extend through the front wall of the container and receive and secure the spare tire. The top portion is removable to receive leg members for conversion to a table. A modified top portion has openings in the side walls covered with wire mesh for use in transporting animals. The carrier mounting frame is elongated with one end pivoted to be releasably secured to the rear end of the vehicle. The horizontal position of the container is adjustable on the rear end of the vehicle.

SUMMARY OF THE INVENTION

It is therefore an object of the present invention to provide an article carrier which may be easily attached to the rear end of vehicles to provide additional storage space.

It is another object of this invention to provide a an article carrier which is removably secured and supported on an existing spare tire mounting frame or may be provided with its own mounting frame.

Another object of this invention is to provide an article carrier which may be easily installed by removing the spare tire from the existing spare tire mounting frame, installing the carrier, and securing the carrier by remounting the tire inside the carrier on the mounting frame.

Another object of this invention is to provide an article carrier which will pivot outwardly from the rear end of the vehicle to allow freedom of access thereto.

Another object of this invention is to provide an article carrier having a removable top portion which may be easily converted for use as a table.

A further object of this invention is to provide an article carrier having a modified top portion allowing the carrier to be used for transporting animals.

A still further object of this invention is to provide an article carrier which is simple in construction, economical to manufacture, attractive in appearance, and rugged and durable in use.

Other objects of the invention will become apparent from time to time throughout the specification and claims as hereinafter related.

The above noted objects and other objects of the invention are accomplished by providing an article carrier for attachment to recreational vehicles which comprises a box-like container for carrying articles removably secured and supported on a spare tire mounting frame or its own separate mounting frame. The container has a bottom portion and a top portion releasably hinged together and a rear wall with a tapered boxlike portion adapted to receive and substantially surround a wheel mount member of the frame.

Wheel attaching lugs extend through the front wall of the container and receive and secure the spare tire. The top portion is removable to receive leg members for conversion to a table. A modified top portion has openings in the side walls covered with wire mesh for use in transporting animals. The carrier mounting frame is elongated with one end pivoted to be releasably secured to the rear end of the vehicle. The horizontal position of the container is adjustable on the rear end of the vehicle.

DESCRIPTION OF THE PREFERRED EMBODIMENT

Figure 1:
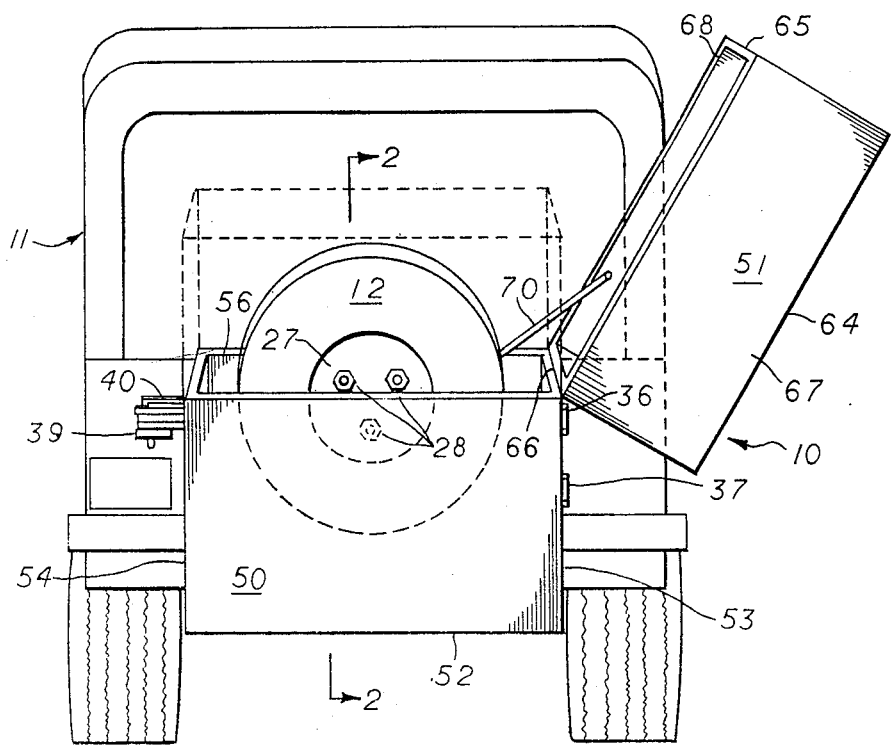
FIG. 1 is a perspective view of the rear end of a jeep type vehicle having the article carrier in accordance with the present invention mounted thereon.

Referring to the drawings by numerals of reference, there is shown in FIG. 1 a preferred article carrier 10 mounted on the rear of a recreational vehicle 11 and is shown as carrying a spare tire 12.

The article carrier is a box-like container adapted to be attached to the rear end of vehicles already having a spare tire mounting frame installed or it may be supplied with its own mounting frame for installation on vehicles not having a spare tire mounting frame.

Figure 3:
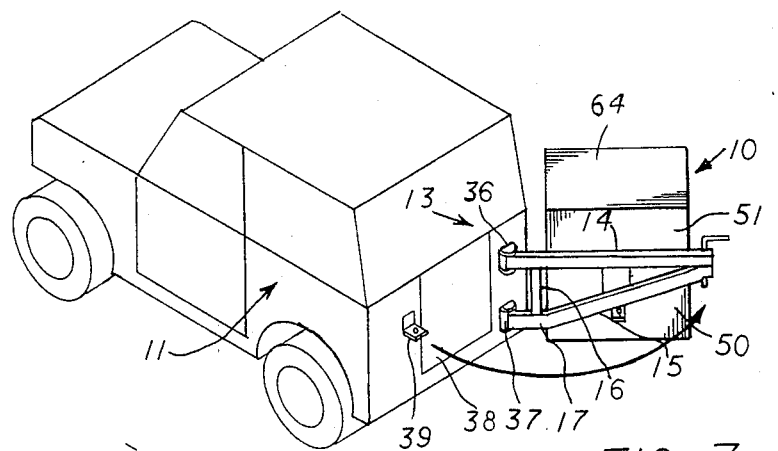
FIG. 3 is an isometric view of the vehicle having the article carrier mounted thereon and pivoted to the extended position away from the rear of the vehicle.

The mounting frame 13, as best shown in FIG. 3, comprises an elongated horizontal upper support bar 14, a diagonal lower support bar 15, and a vertical support bar 16, of square tubing. The diagonal lower support bar 15 has a short horizontal lower end 17, and a short horizontal upper end 18 which is secured by means such as welding to the underside of the upper horizontal support bar 14 near one end.

The main portion 19 (FIG. 4) of the diagonal support bar extends diagonally beneath the upper horizontal support bar 14. The vertical support bar 16 is secured by means such as welding between the horizontal upper support bar 14 and the horizontal lower end 17 of the diagonal support bar 15 to extend vertically therebetween.

A wheel mount member 20, generally H-shaped in crosssection, having rectangular front and rear flanges 21 and 22 and a rectangular vertical web 23 extending perpendicularly therebetween is secured vertically to the horizontal upper support bar 14 and the diagonal support bar 15 intermediate, their lateral ends to extend outwardly therefrom.

A trapezoidal shaped plate 24 is secured horizontally to the top edges of the H-shaped member 20, and the top of the horizontal support bar 14. Three threaded lugs 25 are secured to the front flange 21 to extend outwardly in axial aligment with mounting holes 26 in the wheel 27 of the spare tire 12 and are provided with lug nuts 28 to threadedly secure the spare tire.

A rectangular lower brace member 29 is secured to the rear flange 22 to depend therefrom and its lower end 30 is bent in a generally C-shaped configuration. Threaded holes 31 are provided in the bent lower end 30 and in the horizontal support bar 14. An adjusting bolt 32 has its shank threadedly received in each threaded hole 31 and its head 33 extends outwardly therefrom to contact the rear wall of the container.

The rear wall 56 of the container rests on the head of the bolts 32. A lock nut 34 is threadedly received on each bolt shank whereby the head 33 of the bolt may be locked at variable distances from the brace member 29 and horizontal support member 14 for adjusting the vertical position of the container relative to the rear end of the vehicle.

A pair of hinge brackets 36 and 37 are secured in vertical spaced alignment by conventional means such as bolting to the rear end of the vehicle 10 adjacent one side of the tailgate 38. An L-shaped latch bracket 39 is secured in horizontal alignment of the upper hinge bracket 36 to the rear end of the vehicle adjacent the opposed side of the tailgate. One outer end of the upper support bar 14, and the outer lower end of the diagonal support bar 17 are pinned within the hinged brackets 36 and 37 to pivot about the vertical axis.

When in the latched position adjacent the tailgate 38, the other end of the upper support bar 14 is received in the latch bracket 39 and secured by insertion of a latch pin 40 through vertically aligned holes 41 and 42 provided through the upper support bar and the outwardly extended portion of the latch bracket 39, respectively. In the unlatched position, the latch pin 40 is removed and the mounting frame 13 is pivoted about the vertical axis of the hinges 36 and 37. In this position, the tailgate may be raised or lowered.

The carrier box 10 comprises a two-piece box-like container having a bottom portion 50 and a top portion 51 hingedly attached thereto. The bottom portion 50 has a bottom wall 52, opposed side walls 53 and 54, and opposed front and rear walls 55 and 56 respectively.

Figure 2:
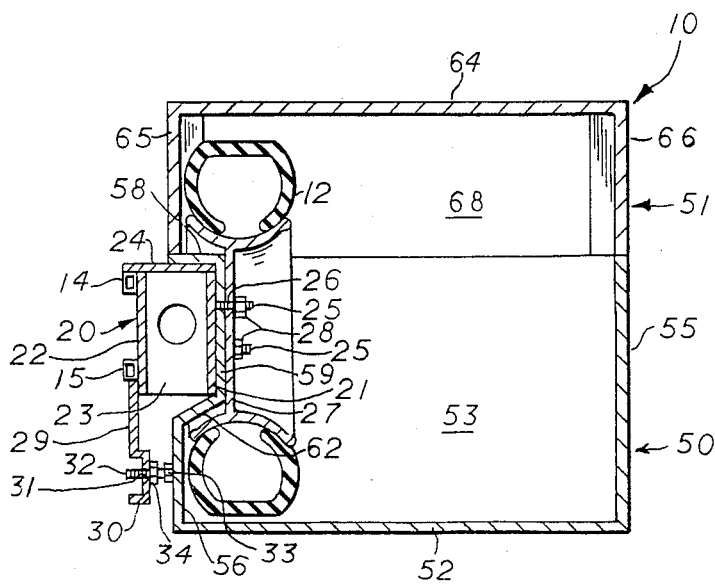
FIG. 2 is a vertical cross section taken along line 2—2 of FIG. 1 showing the interior of the article carrier.
Figure 4:
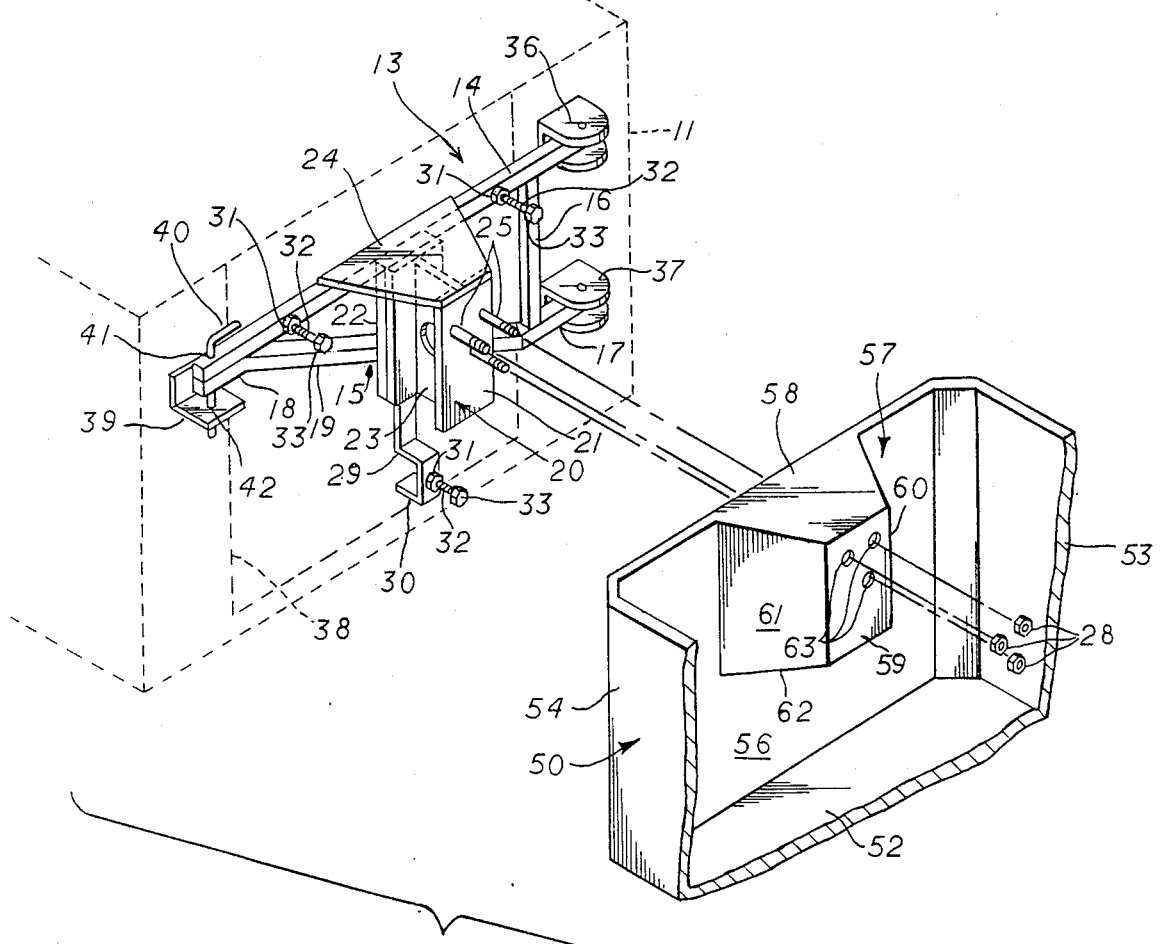
FIG. 4 is an exploded isometric view of the mounting structure for the article carrier with portions of the carrier broken away.

As best shown in FIGS. 2 and 4, the upper portion of the rear wall 56 has a tapered box-like portion 57 extending inwardly therefrom. The box-like portion 57 has a generally triangular shaped top wall 58, a rectangular vertical front wall 59, opposed side walls 60, 61, and a bottom wall 62 defining an open cavity in the rear wall to receive the H-shaped wheel mount member 20.

The side walls 60 and 61 and bottom wall 62 extend angularly outward between the rear wall 56 of the lower portion 50 and the front wall 59 of the tapered box-like portion 57 for strength. The rectangular vertical front wall 59 is provided with three holes 63 in axial alignment with the threaded lugs 25 of H-shaped member 20.

The top portion 51 has a top wall 64, opposed side walls 65 and 66, and opposed front and back walls 67 and 68 respectively. A pair of hinges 69 attached to the side walls 55 and 66 connect the top portion 51 to the bottom portion 50 and allows the top to pivot open relative to the bottom portion. A strap 70 having ends attached to the interior of the rear walls 68 and 53 determines the extent of pivotal movement.

To secure the container to the mounting frame 13, the lower portion 50 of the box enclosure is placed adjacent to the frame with the tapered box-like portion 57 in alignment with the front flange 21 of the H-shaped member 20. The container is then moved toward the mounting frame. The lugs 25 are received within the holes 63 so the front flange 21 comes to rest at the back of the front wall 59 of the tapered boxlike portion 57.

The spare tire 12 is placed into the lower portion of the container with the holes 26 of the spare tire rim 27 received on the lug bolts 25 and the lug nuts 28 are threadedly tightened onto the lug bolts. The adjusting bolts 32, extending from the lower brace member 29 and horizontal support member 14, are adjusted so that the head 33 of the bolt is resting firmly against the rear wall 56 and the lock nut 34 is tightened against the members 29 and 14. In this manner, the article carrier 10 is secured to the mounting frame 13 in a generally level position.

Figure 5:
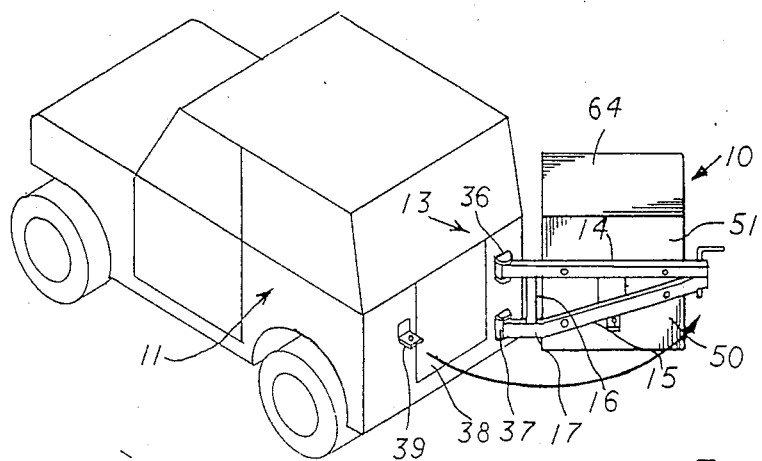
FIG. 5 is an isometric view of the vehicle having a modified article carrier mounted thereon and pivoted to the extended position away from the rear of the vehicle.
Figure 6:
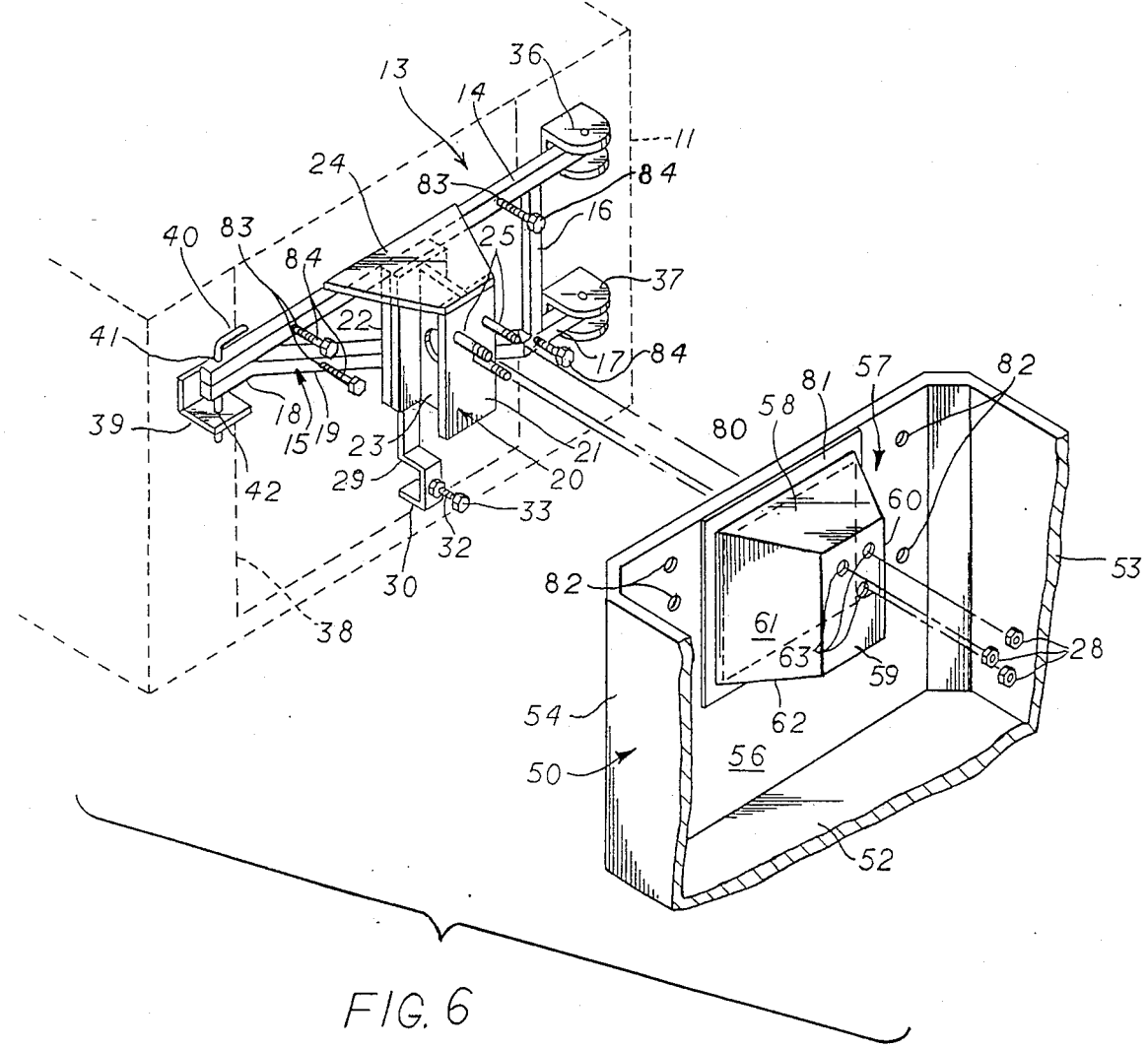
FIG. 6 is an exploded isometric view of the mounting structure for a modified article carrier with portions of the carrier broken away.

FIGS. 5 and 6 illustrate how the article carrier may be adapted to fit various commercial spare tire mounting frames. Identical parts previously described are given the same numerals of reference and their description will not be repeated to avoid repetition.

In the embodiment of FIGS. 5 and 6, the lower portion 50 is constructed with an opening 80 in the rear wall 56. Various sizes and shapes of inwardly extending box-like members 57 having mounting flanges 81 may be manufactured separately and installed over the opening by securing the mounting flanges by conventional means to the rear wall. The box-like members may be interchanged in the manufacturing process to form inwardly projecting cavities which will fit various spare tire mounting frames.

Holes 82 may be provided through the rear wall 56 and threaded holes 83 in the spare tire mounting frame 13 which receive bolts 84 to secure the article carrier to the spare tire mounting frame.

It should be understood that the inwardly extending box-like member 57 could be eliminated and the rear wall simply provided with an opening to receive the spare tire mounting member 20. In this instance, the rear wall of the article carrier would be bolted to the spare tire mounting frame as previously described.

Figure 7:
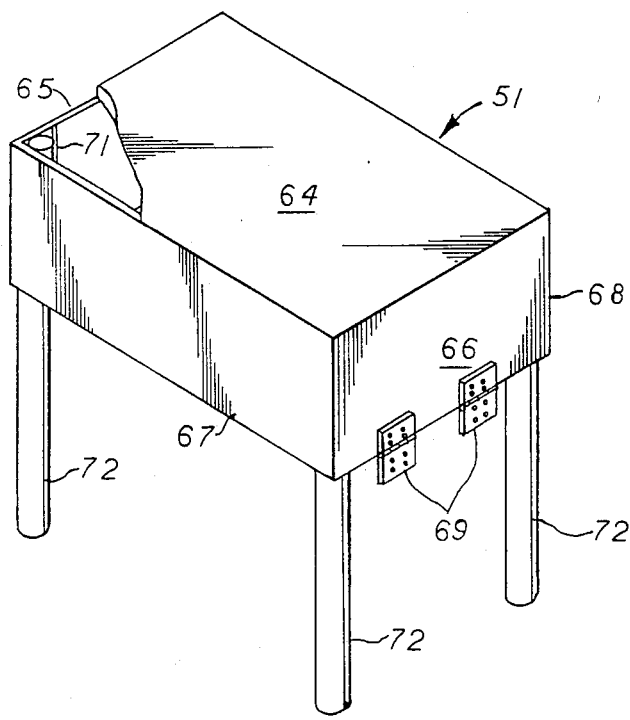
FIG. 7 is an isometric view of the top of the article carrier assembled into a table.

Referring now to FIG. 7, the top portion 51 may be removed from the lower portion 50 and converted for use as a table by removing the lower elements of the hinges 69 from the lower portion. It should be understood that separable hinges may be used to facilitate easy removal. The interior corners of the top portion 51 are provided with leg receiving means such as diagonal braces 71 which form corner openings. Leg members 72, which may be carried in the lower portion 50, are inserted into the corners of the top portion.

Figure 8:
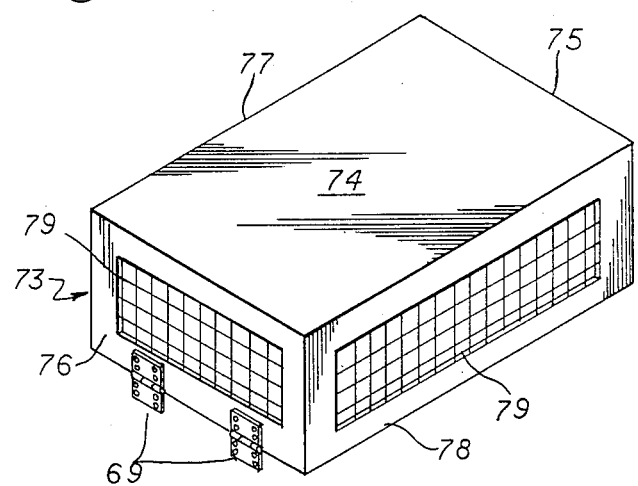
FIG. 8 is an isometric view of an alternate top for the article carrier modified to transport animals.

FIG. 8 shows a modified top portion 73 having a top wall 74, opposed side walls 75 and 76, and opposed front and back walls 77 and 78 respectively. Openings are formed in the side walls 75, 76, 77, and 78 and are covered by a wire mesh material 79. A pair of hinges 69 attached to one side wall connects the top portion 73 to the bottom portion 50 and allows the top to pivot open relative to the bottom portion. Separable hinges may be used to facilitate easy installation and removal. A strap (not shown), having ends attached to the interior of the rear walls, determines the extent of pivotal movement. This modification is particularly useful in transporting animals, such as hunting dogs or other pets.

While this invention has been described fully and completely with special emphasis upon a preferred embodiment, it should be understood that within the scope of the appended claims, the invention may be practiced otherwise than as specifically described herein.

We claim:

1. An article carrier for attachment to vehicles comprising;

an elongated mounting frame having one end adapted to be pivotally secured to the rear end of the vehicle at one side thereof to pivot vertically thereabout and the other end extending laterally therefrom and adapted to be releasably secured transversely to the other side of the rear end of the vehicle, and a container for carrying articles removably secured to said mounting frame and supported thereby, said container having a bottom portion and a top portion releasably and hingedly connected thereto, said container bottom portion comprising a bottom wall, side walls, a rear wall adjacent the rear end of the vehicle, and a front wall spaced outwardly of the rear end of the vehicle, said container interior of sufficient size and shape to receive a spare vehicle tire and having storage space for receiving luggage and other articles, wheel attachment means comprising threaded bolts extending through the container rear wall into the interior of said container, a plurality of nuts secured on said threaded bolts to secure said container releasably on said mounting frame, and the ends of said threaded bolts being adapted to removably receive and secure a vehicle spare tire against said container rear wall with said container rear wall securely positioned between said spare tire and said mounting frame.

2. An article carrier according to claim 1 including hinge means adapted to be secured to the rear end of the vehicle at one side thereof to receive one end of said mounting frame, and latching means adapted to be secured to the other side of the rear end of the vehicle to releasably receive and secure the laterally extended end of said mounting frame.

3. An article carrier according to claim 1 including a wheel mount member projecting rearwardly outward from said mounting frame relative to the rear end of the vehicle and having wheel attachment means comprising said threaded bolts at its outward end for receiving the spare vehicle tire.

4. An article carrier, according to claim 1 in which said wheel attachment bolts extend through the container rear wall into the interior of said container and the spare vehicle tire is received and secured thereon to capture said container rear wall between the spare tire and said mounting frame.

5. An article carrier, according to claim 3 in which said container rear wall has a tapered box-like portion extending inwardly therefrom into the container and adapted to receive and substantially surround said wheel mount member.

6. An article carrier, according to claim 3 in which said container rear wall has an opening therein to receive said wheel mount meber therethrough.

7. An article carrier, according to claim 1, in which said mounting frame comprises an elongated horizontal upper support bar, a diagonal lower support bar secured diagonally therebelow, and a vertical support bar secured vertically between said horizontal upper support bar and said diagonal lower support bar, a wheel mount member secured to said upper support bar and said lower support bar to project rearwardly outward therefrom relative to the rear end of the vehicle and provided with wheel attachment means at its outward end for receiving the spare vehicle tire.

8. An article carrier according to claim 3 in which said wheel mount member comprises
a generally H-shaped member having rectangular parallel front and rear flanges and a rectangular web extending perpendicular and vertically therebetween,
said rear flange secured vertically to said mounting frame intermediate the lateral ends thereof adjacent the rear end of the vehicle, and said front flange spaced outwardly of the rear end of the vehicle, and 9. An article carrier according to claim 8 including
a lower brace member secured to said rear flange to depend therefrom and adjusting means at its lower end for adjusting the vertical position of said container relative to the rear end of the vehicle.

10. An article carrier according to claim 9 in which said adjusting means comprises
a bolt having its shank threadedly received in the lower end of said lower brace member and its head extending outwardly therefrom rearward relative to the rear end of the vehicle to contact the rear wall of said container and a lock nut threadedly received on the shank whereby the head of the bolt may be locked at variable distances spaced from said brace member for adjusting the vertical position of said container relative to the rear end of the vehicle.

11. An article carrier according to claim 1 in which said container top portion comprises a top wall, opposed side walls, and opposed front and rear wall.

12. An article carrier according to claim 1 in which said container top portion comprises a top wall, opposed side walls, and opposed front and rear walls,
said side, front and rear walls having openings therethrough covered with wire mesh for use in transporting animals.

13. An article carrier according to claim 1 in which said container top portion comprises a top wall, opposed side walls, and opposed front and rear walls, and
leg receiving means provided within the interior of said top portion for removably receiving a set of leg members for conversion to a table.

14. An article carrier for removable attachment to a movable spare tire mounting frame installed on vehicles of all type having a wheel mount member projecting rearwardly outward from the mounting frame relative to the rear end of the vehicle and having wheel attachment means at its outer end for receiving the spare vehicle tire, said article carrier comprising:
a container for carrying articles adapted to be removably secured to the existing spare tire mounting frame and supporting thereby,
said container having a bottom portion comprising a bottom wall, side walls, a rear wall adjacent the rear end of the vehicle, and a front wall spaced outwardly of the rear end of the vehicle, and a top portion releasably and hingedly connected to said bottom portion,
said container interior being of sufficient size and shape to receive a spare vehicle tire and having storage space for receiving luggage and other articles, and
said container rear wall having a tapered box-like portion extending inwardly therefrom into the container and adapted to receive and substantially surround the wheel mount member of the existing spare tire mounting frame when secured thereon.

15. An article carrier, according to claim 14 in which said container rear wall has an opening therein to receive said wheel mount member therethrough.

16. An article carrier according to claim 14 in which said tapered box-like portion having top wall, a front wall, opposed side walls, and a bottom wall defining an inward concave recepticle in the container rear wall to receive the existing wheel mount member, the existing wheel mount attachment means extending through said box-like portion front wall and the spare vehicle tire is received and secured thereon to capture said container rear wall between the spare tire and said wheel mount member.

17. An article carrier according to claim 14 in which said container top portion comprises a top wall, side walls, and front and rear walls.

18. An article carrier according to claim 14 in which said container top portion comprises a top wall, opposed side walls, and opposed front and rear walls,
said side, front and rear walls having openings therethrough covered with wire mesh for use in transporting animals.

19. An article carrier according to claim 14 in which said container top portion comprises
a top wall, side walls, and front and rear walls, and
leg receiving means provided within the interior of said top portion for removably receiving a set of leg members for converting said top portion for use as a table.

* * * * *